(12) United States Patent
LeBlanc

(10) Patent No.: US 8,969,464 B2
(45) Date of Patent: Mar. 3, 2015

(54) SYNTHETIC CONSTRUCTION AGGREGATE AND METHOD OF MANUFACTURING SAME

(75) Inventor: Michael W. LeBlanc, British Columbia (CA)

(73) Assignee: CityMix, Inc., Seattle, WA (US)

(*) Notice: Subject to any disclaimer, the term of this patent is extended or adjusted under 35 U.S.C. 154(b) by 0 days.

(21) Appl. No.: 13/447,146

(22) Filed: Apr. 13, 2012

(65) Prior Publication Data

US 2013/0102727 A1    Apr. 25, 2013

Related U.S. Application Data

(60) Provisional application No. 61/475,008, filed on Apr. 13, 2011, provisional application No. 61/564,689, filed on Nov. 29, 2011.

(51) Int. Cl.

| C04B 16/04 | (2006.01) |
|---|---|
| B05D 7/02 | (2006.01) |
| C08K 3/34 | (2006.01) |
| C04B 16/08 | (2006.01) |
| C04B 28/02 | (2006.01) |
| C04B 18/02 | (2006.01) |
| C04B 20/10 | (2006.01) |
| C04B 111/40 | (2006.01) |

(52) U.S. Cl.
CPC ............ *C04B 16/04* (2013.01); *C04B 28/02* (2013.01); *C04B 18/021* (2013.01); *C04B 18/027* (2013.01); *C04B 20/1074* (2013.01); *C04B 20/1085* (2013.01); *C04B 2111/40* (2013.01)
USPC ........... 524/493; 524/492; 524/577; 524/791; 427/222

(58) Field of Classification Search
CPC ....................................................... C04B 16/04
USPC .................................. 524/492, 493, 791, 577
See application file for complete search history.

(56) References Cited

U.S. PATENT DOCUMENTS

| 6,340,713 B1 | 1/2002 | Gluck et al. | |
|---|---|---|---|
| 2004/0028904 A1* | 2/2004 | Park | 428/402 |
| 2009/0081459 A1* | 3/2009 | Yoon et al. | 428/404 |

FOREIGN PATENT DOCUMENTS

| CA | 1227311 | 9/1987 |
|---|---|---|
| CA | 2687014 | 12/2008 |
| CA | 2687014 A1 | 12/2008 |

OTHER PUBLICATIONS

OxyChem Sodium Silicate Liquid Alkaline—Material Safety Data Sheet—http://msds.oxy.com/DWFiles/M35886_NA_EN%236.pdf.*
Non-Final Office Action issued for Canadian Patent Application No. 2,797,167, Dated Sep. 19, 2013; pp. 1-3.
Canadian Intellectual Property Office; CA Appl. No. 2,797,167; Office Action dated Jun. 12, 2014; pp. 1-3.

* cited by examiner

*Primary Examiner* — Ling Choi
*Assistant Examiner* — Ronald Grinsted
(74) *Attorney, Agent, or Firm* — Lane Powell, PC; Priya Sinha Cloutier

(57) ABSTRACT

Synthetic aggregates and methods of producing the same are disclosed herein. The aggregates advantageously utilize styrene polymer particles coated with additional materials such as fly ash, silica fume, and/or "liquid glass" in order to provide an improved means for manufacturing lightweight concrete that is significantly stronger than conventional lightweight concretes.

4 Claims, 3 Drawing Sheets

SYNTHETIC CONSTRUCTION AGGREGATE AND METHOD OF MANUFACTURING SAME

CROSS-REFERENCE TO RELATED APPLICATIONS

This application claims priority from U.S. provisional patent application Ser. No. 61/475,008, filed Apr. 13, 2011, and U.S. provisional patent application Ser. No. 61/564,689, filed Nov. 29, 2011 which are incorporated by reference as if fully set forth herein.

BACKGROUND OF THE INVENTION

Concrete is a composite construction material composed primarily of aggregate, cement and water. There are many formulations that have varied properties. The aggregate is generally coarse gravel or crushed rocks such as limestone, or granite, along with a fine aggregate such as sand. The cement, commonly portland cement, and other cementitious materials such as fly ash and slag cement, serve as a binder for the aggregate. Various chemical admixtures may also added to achieve varied properties. Water is then mixed with this dry composite which enables it to be shaped (typically poured) and then solidified and hardened into rock-hard strength through a chemical process known as hydration. The water reacts with the cement which bonds the other components together, eventually creating a robust stone-like material. Concrete has relatively high compressive strength, but much lower tensile strength. For this reason is usually reinforced with materials that are strong in tension (often steel).

Concrete is widely used for making architectural structures, foundations, brick/block walls, pavements, bridges/overpasses, motorways/roads, runways, parking structures, dams, pools/reservoirs, pipes, footings for gates, fences and poles and even boats.

Construction aggregate, or simply "aggregate", is a broad category of coarse particulate material used in construction, including sand, gravel, crushed stone, slag, recycled concrete and geosynthetic aggregates. Aggregates are a component of composite materials such as concrete and asphalt concrete; the aggregate serves as reinforcement to add strength to the overall composite material. Due to the relatively high hydraulic conductivity value as compared to most soils, aggregates are widely used in drainage applications such as foundation and French drains, septic drain fields, retaining wall drains, and road side edge drains. Aggregates are also used as base material under foundations, roads, and railroads. In other words, aggregates are used as a stable foundation or road/rail base with predictable, uniform properties (e.g. to help prevent differential settling under the road or building), or as a low-cost extender that binds with more expensive cement or asphalt to form concrete.

Pozzolans are commonly used as an addition (the technical term is "cement extender") to concrete mixtures to increase the long-term strength and other material properties, and in some cases reduce the material cost of, concrete. A pozzolan is a material which, when combined with calcium hydroxide, exhibits cementitious properties. Pozzolans are primarily vitreous siliceous materials which react with calcium hydroxide to form calcium silicates; other cementitious materials may also be formed depending on the constituents of the pozzolan.

The pozzolanic reaction may be slower than the rest of the reactions that occur during cement hydration, and thus the short-term strength of concrete made with pozzolans may not be as high as concrete made with purely cementitious materials; conversely, highly reactive pozzolans, such as silica fume and high reactivity metakaolin can produce "high early strength" concrete that increase the rate at which concrete gains strength.

Many pozzolans available for use in construction today were previously seen as waste products, often ending up in landfills. Use of pozzolans can permit a decrease in the use of Portland cement when producing concrete; this is more environmentally friendly than limiting cementitious materials to Portland cement.

One common pozzolan used in modern concrete is fly ash. Fly ash is one of the residues generated in combustion, and comprises the fine particles that rise with the flue gases. In an industrial context, fly ash usually refers to ash produced during combustion of coal. Fly ash is generally captured by electrostatic precipitators or other particle filtration equipment before the flue gases reach the chimneys of coal-fired power plants, and together with bottom ash removed from the bottom of the furnace is in this case jointly known as coal ash. Depending upon the source and makeup of the coal being burned, the components of fly ash vary considerably, but all fly ash includes substantial amounts of silicon dioxide ($SiO_2$) (both amorphous and crystalline) and calcium oxide ($CaO$), both being endemic ingredients in many coal-bearing rock strata.

Owing to its pozzolanic properties, fly ash is used as a replacement for some of the cement content of concrete. It can replace up to 30% by mass of Portland cement, and can add to the concrete's final strength and increase its chemical resistance and durability. Recently concrete mix design for partial cement replacement with High Volume Fly Ash (50% cement replacement) has been developed.

Silica fume, is another commonly used pozzolanic material, also known as microsilica, is an amorphous (non-crystalline) polymorph of silicon dioxide, silica. It is an ultrafine powder collected as a by-product of the silicon and ferrosilicon alloy production and consists of spherical particles with an average particle diameter of 150 nm. Because of its extreme fineness and high silica content, silica fume is a very effective pozzolanic material.

Silica fume is added to concrete to improve its properties, in particular its compressive strength, bond strength, and abrasion resistance. These improvements stem from both the mechanical improvements resulting from addition of a very fine powder to the cement paste mix as well as from the pozzolanic reactions between the silica fume and free calcium hydroxide in the paste.

Polystyrene is an aromatic polymer made from the monomer styrene, a liquid hydrocarbon that is manufactured from petroleum by the chemical industry. Polystyrene is one of the most widely used plastics, the scale being several billion kilograms per year. Polystyrene can either be a thermoset or a thermoplastic. A thermoplastic polystyrene is in a solid (glassy) state at room temperature, but flows if heated above its glass transition temperature of about 100° C. (for molding or extrusion), and becomes solid again when cooled. Pure solid polystyrene is a colorless, hard plastic with limited flexibility. It can be cast into molds with fine detail. Polystyrene can be transparent or can be made to take on various colors.

Polystyrene can be recycled, and has the number "6" as its recycling symbol. The increasing oil prices have increased the value of polystyrene for recycling. No known microorganism has yet been shown to biodegrade polystyrene, and it is often abundant as a form of pollution in the outdoor environment, particularly along shores and waterways especially in its low density cellular form.

Expanded polystyrene (EPS) is a rigid and tough, closed-cell foam. It is usually white and made of pre-expanded polystyrene beads. Familiar uses include molded sheets for building insulation and packing material ("peanuts") for cushioning fragile items inside boxes. Sheets are commonly packaged as rigid panels which are also known as "beadboard".

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF PREFERRED EMBODIMENTS

In the following detailed description, numerous specific details are set forth in order to provide a thorough understanding of various embodiments. However, those skilled in the art will understand that the present invention may be practiced without these specific details, that the present invention is not limited to the described embodiments, and that the present invention may be practiced in a variety of alternate embodiments. In other instances, well known methods, procedures, components, and systems have not been described in detail. One of skill in the art will appreciate various modifications to the process, to the ingredients, and to the proportions of ingredients that are possible. One skilled in the art will further appreciate that the following steps can be scaled to allow larger or smaller quantities of product to be made. For example, the following description primarily teaches using expanded polystyrene (EPS) content as a primary ingredient in the aggregate. However, one of ordinary skill in the art will recognize that any suitable form of styrene polymers can be used in place of the EPS content with similarly beneficial results. In particular, manufactured, expanded or partially expanded polystyrene beads or other prepared pieces of suitable size may be used without departing from the scope of the aggregate described herein. Similarly either virgin or recycled EPS can be used as the raw EPS material.

Exemplary synthetic aggregates for use with cement, stucco, mortar or gypsum-based mixtures and exemplary methods for making such synthetic aggregates are described herein. The aggregates described herein can be blended to dry mix stucco, mortar, or concrete or can be directly added to wet-mix stucco, mortar, or concrete. These aggregates advantageously increase fire resistance, flexile strength, impact resistance over conventional aggregates. The higher air-containing content of the EPS material decreases weight and adds valuable insulative and sound-absorbing properties to the final product (e.g., stucco, mortar, or concrete). Finely ground and coated EPS also provides a cosmetic benefit in that raw or large EPS beads or fragments are not visibly exposed on the mixture surface, and which can further adversely affect finish appearance and desirability by creating pits, bumps, lumps other surface irregularities.

Figure 1:
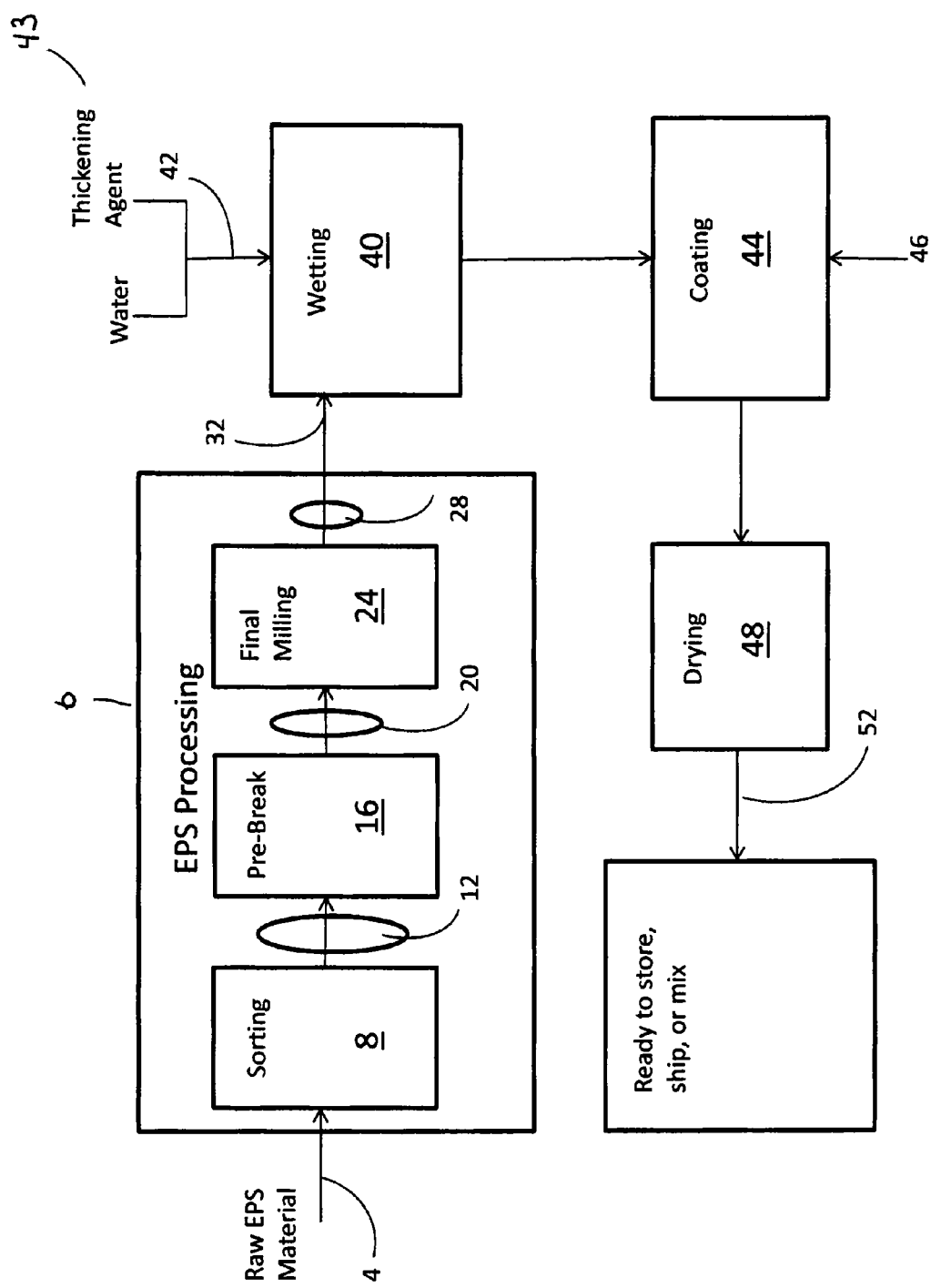
FIG. 1 depicts a flow chart indicating the preferred process for manufacturing a synthetic aggregate.

Referring to FIG. 1, in an exemplary embodiment of a method of preparing the present aggregate, the components of which are described in detail below, raw EPS material 4 processed 6 whereby the raw EPS material 4 is finely crushed, shredded, texturized, or otherwise reduced into preferably non-spherical EPS particles 32 and placed in a wetting station 40. A wetting agent 42 is introduced to the EPS particles 32. The wetting agent is preferably water mixed with a thickening agent such as acrylic. The EPS particles are then thoroughly combined with the wetting agent using a mixing device, such as a paddle mixer, or other blending method, such that the EPS content is substantially and uniformly coated with the wetting agent. After the EPS content is coated with the wetting agent, coating agents 46 are added in a coating step 44. The coating agents may include fly ash or silica fume or some combination thereof. In a particular embodiment, the coating agent consists of equal parts by volume of fly ash and silica fume, combined with polyvinyl acetate ("PVA") fibers. Other pozzolanic materials may also serve as effective additives. In an exemplary embodiment of the aggregate, the proportion of ingredients are:

| Ingredient | Volume | % by Volume |
|---|---|---|
| Ground EPS Content | 4 gallons | 77.1% |
| Wetting Agent | 0.125 gallons | 2.4% |
| Fly ash | 0.5 gallons | 9.6% |
| Silica Fume | 0.5 gallons | 9.6% |
| PVA Fibers | 0.0625 gallons | 1.2% |

Finally the wetted, coated EPS particles are dried 48. This process creates a lightweight aggregate 52 for aerating cement, stucco and other cementitious materials. The use of finely ground EPS particles maximizes the encapsulated air in the aggregate by reducing the interstitial volume surrounding fully formed foam beads or scrap fragments. Larger beads used as a filler in cement and cementitious products are typically able to decrease cement-based product weights up to a limit of approximately 20%, while embodiments of the aggregate described herein can decrease the same product weights by up to 80% or more, for example as may be preferable in the case of certain cement stucco applications, floating concrete, geo-filled slurries, or other products or applications that require ultra-lightweight materials.

For certain specialized uses, such as stucco, a small amount of a surfactant may also be added to the mix at this point. After adding the coating agents and any other dry ingredients, the aggregate is again mixed thoroughly with mechanical paddle mixer until coating ingredients and fibers are evenly distributed in mixture.

The fly ash, silica fume and PVA fiber ingredients should be thoroughly blended with the EPS and other ingredients using a mechanical mixer or similar mechanism to ensure uniform and homogenous mixing of all ingredients in the matrix.

After the finely shredded EPS particles are wetted with the wetting agent and the fly ash, silica fume and PVA fibers have been thoroughly blended with the finely shredded EPS particles, the removal of excess moisture during the drying step 48 ensures that any potential future storage problems which might be caused by excess moisture are minimized while the aggregate is stored in a bulk or bagged state. The mixture can be dried using conventional methods (e.g., circulating air) or can be allowed to air dry through natural convection. The aggregate is preferably dried until it does not bind together when squeezed.

Finely ground EPS particles combined with appropriate wetting and coating materials is used to incorporate a concentrated air-infused material into the matrix. EPS beads contain approximately 80% air by volume and, therefore, the finer the grind, the greater the concentration of air that can be added to any given mixture. It has been determined that EPS particles sufficiently reduced in size to pass through a 3/16 inch mesh are advantageously suitable for use in the aggregates described herein. Once the finely ground, or otherwise reduced, EPS material is properly wetted and surface-coated to inhibit static and add a stabilizing film of dead weight, then dried, the resulting additive can be quickly and uniformly integrated into the applicable stucco or concrete mixture. Using a preferred method of processing the raw EPS material 4, the size of the finely ground EPS particles 32 may range from 20 to 120 mils (0.508 to 3.048 millimeters).

The exemplary embodiment may advantageously utilize EPS material obtained from post-consumer or manufacturing waste products, whereby foam pieces of various sizes are received from store outlets and other commercial sources. Although Type 1 EPS (1 lb/cu. ft.) and Type 2 EPS (2 lb/cu. ft.) are preferred and are described below, other polystyrene materials, including other densities of EPS material, or other materials based on styrene polymer variants, such as cups, trays, containers, and egg cartons may be also be used. Other recycled products such as pulverized rubber tire fragments and/or other miniaturized plastic components, as well as organic byproducts such as rice hulls or wood chips may also be incorporated into the mix design.

Referring again to FIG. 1, in an exemplary method of preparing the EPS material for use in the aggregates described herein, during the EPS processing step 6, the raw EPS material 4 is sorted 8 and any relatively large foam pieces are broken into smaller sizes no larger than approximately 6" in the longest dimension 12. During this process, the raw EPS pieces are inspected for foam of the wrong type or color and for any loose, foreign objects, such as screws, tape, paper, and other foreign objects incorporated into foam packaging and any such offending material is removed. High and low density foam chunks are also mixed into rough proportion such that, after processing, the EPS particles 32 have an approximate final density of 1.5 pounds per cubic foot. The reduced foam is then put through a pre-break milling process 16, whereby the foam is ground, crushed, cut or otherwise reduced to pieces no more than roughly 2 inches across 20. The reduced foam is then put through a final milling step 24 whereby the EPS material further processed, texturized, shredded, granulated, beaded, or otherwise reduced until the pieces are substantially non-spherical and small enough to be filtered through a 3/16 inch screen 28.

Figure 2:
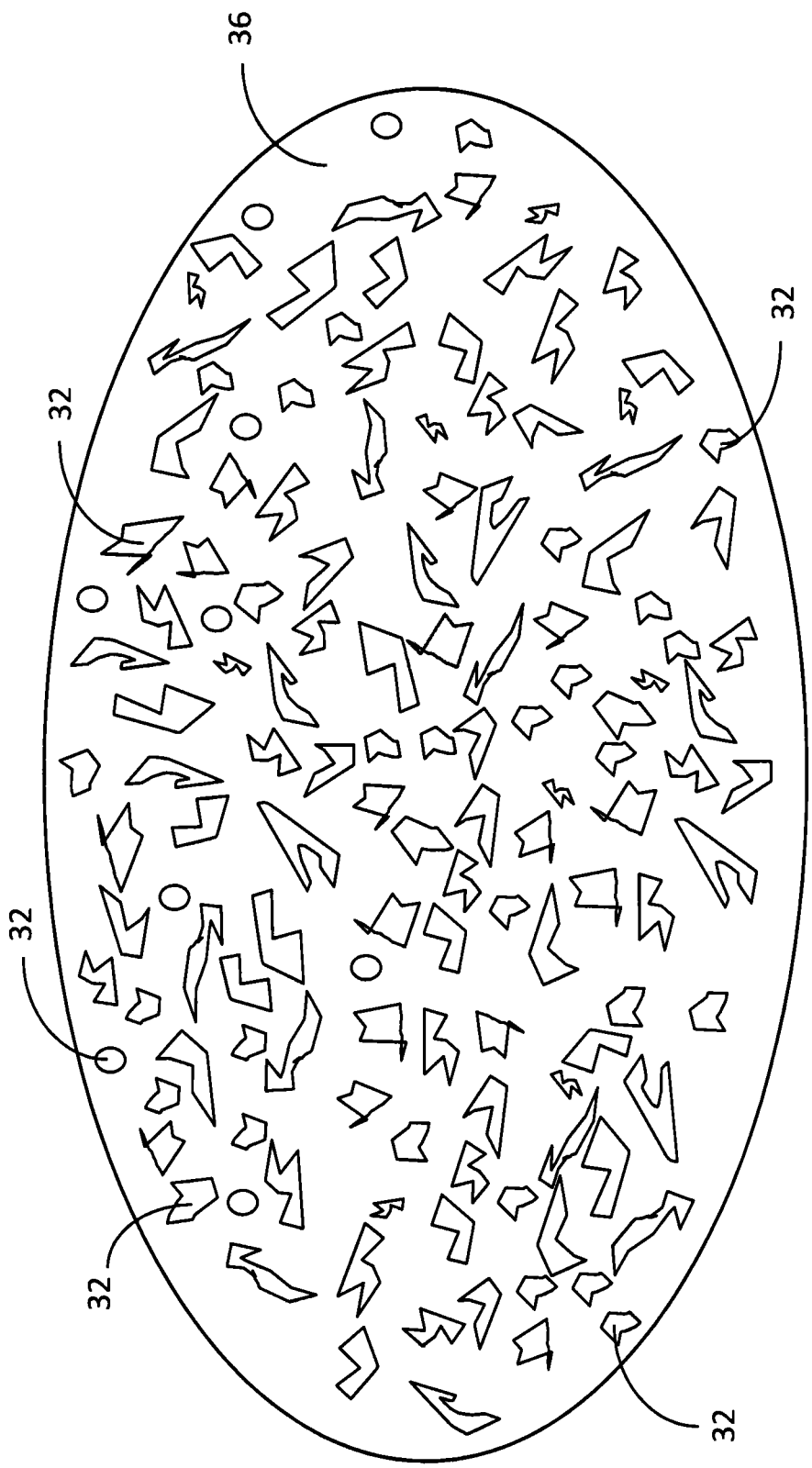
FIG. 2 depicts an abstract cross-sectional view of non-spherical EPS particles, shredded, ground, texturized, or otherwise reduced according to the methods described herein, suspended in a cementitious mixture.

Referring to FIG. 2, grinding, shredding texturizing or otherwise reducing the EPS particles 32 to this size advantageously allows the introduction of higher volume of EPS content into a cementious mixture than possible using conventional EPS-containing aggregates. This provides lighter, smoother and more easily transportable, mixable, trowelable and/or pumpable mixtures and these properties combine to cause much less physical strain on work-persons, machinery and equipment. Additionally, reducing the EPS particles in the manner described above creates irregularly shaped materials that are more easily mixed and resist settling or rising in the mixture (either wet or dry) 36 under vibration. The increased air-containing particulate density also retards the mixture drying process, which helps create better hydration and increases mixture "pot life", and extends applicator "working time." In the case of the utilization of recycled EPS waste material in the mixture, the higher the concentration, the greater the "green" environmental benefit.

Referring again to FIG. 1, pre-coating the EPS particles 32 with a wetting agent 42 including a thickening agent 43 permanently encapsulates the EPS particles with a thin layer of the thickening agent. This layer helps to ensure a uniform bonding of the EPS particles 32 with the later applied coating materials 46 and further allows for a greater percentage of aeration of the bulk mixture than the conventional method of adding EPS content directly to cement products.

The wetting agent 42 allows the EPS-coating additives, described below, to adhere to the surface of the EPS particles 32. The introduction of the moisture in this step also helps weigh down the EPS particles 32, making it easier to uniformly mix with the coating agent(s) 46 in a later step 46. Wetting and later coating the EPS particles also reduces static electricity, which results in a smoother, more readily integrated mixing process. The addition of a thickening agent, such as acrylic, increases the wetting agent's stickiness, which allows for a stronger adhesion of the coating agent 46 to the surface of the EPS particles 32.

In certain embodiments of the aggregate disclosed herein, PVA is used as part of the wetting agent, preferably in a ratio of 3 parts water to 1 part PVA. In other embodiments, such as for use in the creation of stucco products, the addition of a small amount of a surfactant may be added to the wetting agent to improve the viscosity and body of the mix and to help homogenize the mix. The surfactant emulsifies with the water when water is added at the time of mixing of the product. Addition of the surfactant improves the mixability and workability of the mixture. The surfactant improves water resistance, flame and fire resistance and compressive strength. It also reduces the surface PH of stucco materials. In the proportions described in Table 1, the addition of 0.17 oz of surfactant has proven effective.

After wetting 40, a coating agent of fly ash, silica fume and/or, in some embodiments of the present aggregate, cement and/or PVA fibers is applied to the EPS particles 32. The coating agent 46 is mixed with the EPS particles 32 such that the coating agent 46 is uniformly distributed through the mass of EPS particles 32. The surface of the individual EPS particles are thereby coated and the coating agents bond with the individual EPS particles.

The addition of fly ash to the coating agent 46 improves the workability and flowability of the additive. Fly ash is extremely fine, adheres well and improves coverage to small grind EPS particulate surfaces. Fly ash acts as a water-reducer or super-plasticizer. Fly ash fines fill up interstitial spaces in and around the fine grind EPS beads, thereby helping to create a less permeable mixture. Fly ash is a common extender of cement. On vertical applications, the addition of fly ash to cement or cementitious products provides for better adhesion, improves "slump" and helps to "hold" the wall better. The fly ash should be added to the mixture after the moisture is added and before the moisture begins to evaporate. Fly ash also serves to weigh down the foam. Fly ash also allows the material to dry slower (retards the cure rate) because it holds the moisture longer. This also lengthens applicator workability time and helps decrease shrinkage and cracking. Addition of the fly ash keeps the mixture sticky and pliable.

Silica fume, like fly ash, is another recycled waste product and is derived from the production of silicon metal or ferrosilicon alloys in electric arc furnaces. Because of its chemical and physical properties, silica fume is a very reactive pozzolan. Concrete containing silica fume can feature very high strength and can be very durable. Because of its extreme fineness and high silica content, silica fume is a very effective pozzolanic material. Silica fume is commonly added to portland cement concrete to improve its properties, in particular its compressive strength, bond strength, and abrasion resistance. These improvements stem from both the mechanical improvements resulting from addition of a very fine powder to the cement paste mix, as well as from the pozzolanic reactions between the silica fume and free calcium hydroxide in the paste.

The addition of silica fume to the coating agent 46 also reduces the permeability of concrete to chloride ions, which protects the reinforcing steel of concrete from corrosion. With the addition of silica fume, the slump loss with time is directly proportional to increase in the silica fume content due to the introduction of large surface area in the concrete mix by its addition. Although the slump decreases, the mix remains highly cohesive.

Silica fume also reduces bleeding significantly because the free water is consumed in wetting of the large surface area of the silica fume and hence the free water left in the mix for bleeding also decreases. Silica fume also helps improve hydration because it blocks the pores in the fresh concrete so that water within the concrete is not allowed as readily to rise or migrate to the surface.

Silica fume's fine size and inherent stickiness also improves its ability to both coat and bond to the wetted EPS surfaces. It also enhances product hardness.

Although it is known to use fly ash and silica fume as ingredients in common cement based admixtures, aggregates created by the method described herein are unique because the reduced EPS content is first coated with the wetting agent and the fly ash and silica fume are used to adhere to the EPS content in order to minimize the interstitial spaces between the individual EPS particles and enhance the bond strength between both the EPS particles and the cement particles within the desired admixture. Once the resultant lightweight mixture has dried and all ingredients are fully bonded, the resultant lightweight aggregate product ultimately helps to allow greater aeration of the intended aggregate mixture, up to 80%.

Cement may be used as an added ingredient to the coating agents in order to catalyze the hardening of the surface coating of the coated, reduced EPS content. This, in turn, increases the resultant compressive strength of the resultant product. Other pozzolanic materials may also be used as coating agents without departing from the scope of the aggregate described herein.

In additional embodiments of the present aggregate, PVA fibers may be added to the mixture to form a fine, interlocking mesh within the aggregate that helps suspend, stabilize and reinforce the coated EPS and other components in the mixture. The PVA fibers improve the tensile and compressive strength of the concrete manufactured using the present aggregate. The workability of the concrete is also improved while brittleness is reduced. The fibers may be treated with oil to keep the fiber from bonding to the matrix. The oiled and asbestos-like nature of the selected ultra-high performance fiber causes the fiber to react to stresses in the concrete as though the fiber is protected by and moving within a sleeve, which allows the material to essentially "tear" rather than snap or shatter under severe stress forces.

The addition of the PVA fibers at this point allows the fibers to bond directly to the coating additives, which are in turn directly bonded to the ground EPS content material. Thus, when then resulting dried lightweight aggregate is then added to a stucco, concrete, mortar or gypsum based mixture, the individual fiber infused lightweight product particles stay better suspended within the matrix. The bonding of the fibers to the EPS-coated content also helps hold the lightweight aggregate in uniform suspension throughout packaging shipping, handling and dry storage conditions.

Polypropylene, nylon, fiberglass and other types of fibers may serve as appropriate alternatives to the PVA fibers for some uses or applications.

Figure 3:
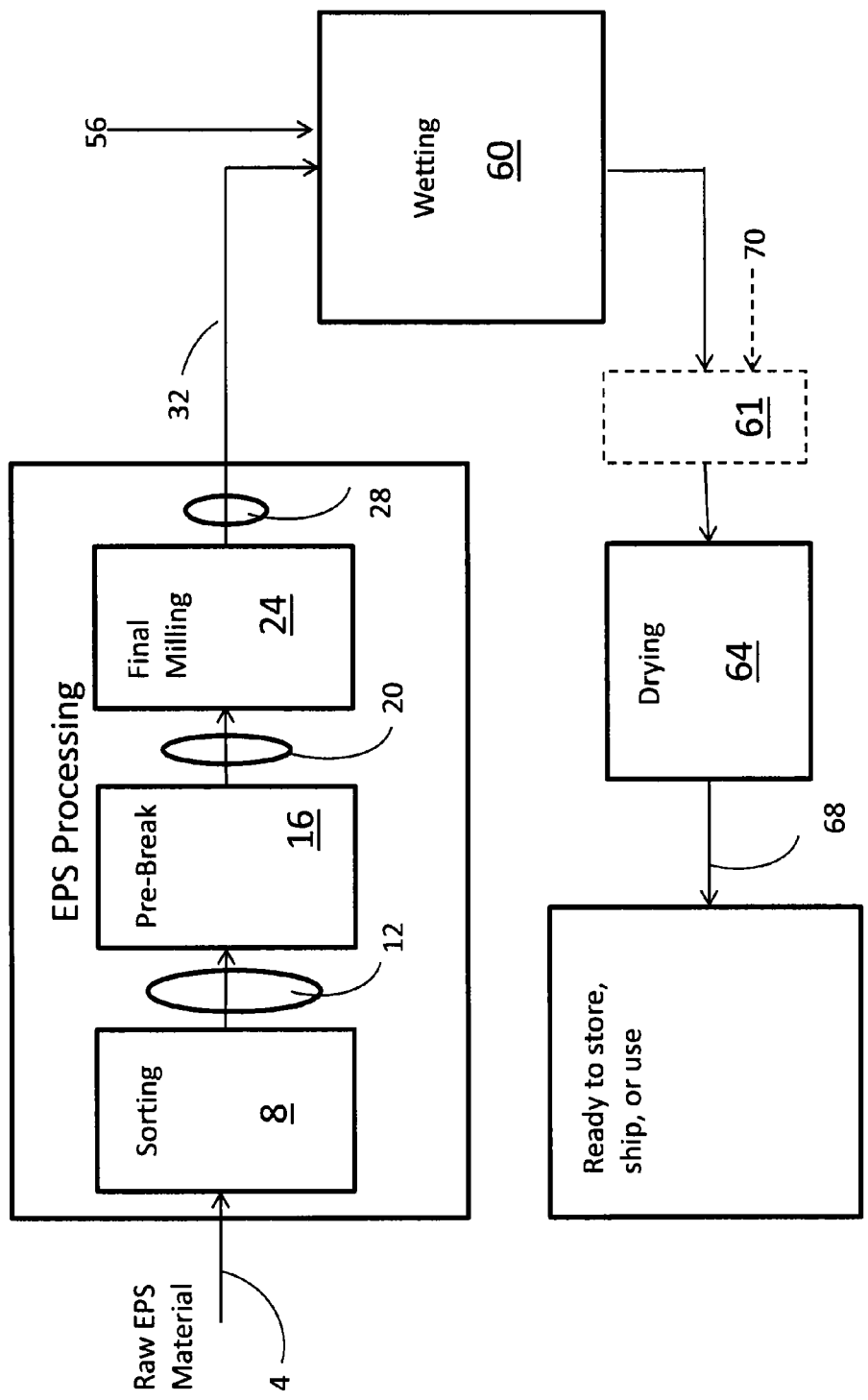
FIG. 3 depicts a flow chart indicating the preferred process for manufacturing an alternative synthetic aggregate.

Referring to FIG. 3, in an alternative embodiment 68 of the present aggregate, the wetting agent disclosed above is replaced by a wetting agent 56 including water soluble, glass forming silicate salt ("liquid glass") such as, preferably, potassium silicate, sodium silicate or lithium silicate. In such embodiments, the raw EPS material 4 may be ground, texturized, or otherwise reduced in the same manner described above to produce the EPS particles 32 having the same characteristics. The alternative wetting agent 56 is prepared by mixing thirty pounds of, preferably liquid, potassium silicate with one hundred pounds of water. In some embodiments, an optional step 61 adds citric acid and/or commercially available pigment agents, such as fly ash or iron oxide, (collectively indicated as 70) to the aggregate. Seven gallons of the alternative wetting agent 56 is sufficient to coat approximately forty five cubic feet of EPS particles 32. In a preferred method of manufacturing such embodiments of the present aggregate, the wetting agent is applied to the EPS particles 32 by spreading the EPS particles 32 over a relatively wide area, then misting the wetting agent 56 over the EPS particles while agitating the EPS particles for approximately two minutes to encourage complete coating 60.

The alternative wetting agent 56 infuses and encapsulates the EPS particles 32 with a smooth, glass-like, fire-retardant coating, thereby increasing the weight of the particles, reducing the accumulation of static charges and generally improving the overall handling characteristics of both the aggregate and the wet concrete product made therefrom. The resulting concrete's structural integrity and water repellency are respectively improved due to the potassium silicate's natural acid resistance and tendency to bind with excess calcium in the concrete. Coating EPS particles in the manner described above has other beneficial attributes during handling of the materials, including lessening of static electricity, reducing the electric spark or flame potential, and decreasing dust. The liquid glass coating also enhances the overall compressive strength of the resulting concrete.

The alternative aggregate 68 advantageously does not require any additional coating agents, such as fly ash, silica fume, or PVA fibers, although such agents may be used to adjust the properties of the resulting aggregate without departing from the scope of the aggregate disclosed herein.

For example, in certain embodiments of the alternative aggregate 68, a pigment, such as black iron oxide, may be added in order to increase the cosmetic appeal of the aggregate as well as to act as a visual aid to ensure uniform coating of the wetting agent on the reduced EPS material. The pigment may also be silica fume or fly ash that can be mixed with the liquid glass in the wetting agent 56. In certain embodiments of the alternative aggregate 68, citric acid is added to the wetting agent in order to catalyze the curing of the selected silicate. The drying time of the aggregate is thereby reduced. The citric acid also advantageously reacts with calcium in the resulting concrete.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A synthetic aggregate consisting of a plurality of styrene polymer particles having a dried coating of water soluble, glass forming silicate salt, wherein said synthetic aggregate is prepared by applying a wetting agent comprising a mixture of water and said water soluble, glass forming silicate salt to said plurality of styrene polymer particles such that the surface area of substantially each particle of said plurality of styrene polymer particles is substantially coated by said wetting agent; and wherein said plurality of particles is then dried, substantially essentially removing the water.

2. The synthetic aggregate of claim 1, wherein said water soluble, glass forming silicate salt is potassium silicate.

3. The synthetic aggregate of claim 1, wherein said water soluble, glass forming silicate salt is sodium silicate.

4. The synthetic aggregate of claim 1, wherein said styrene polymer particles are substantially comprised of expanded polystyrene particles.

\* \* \* \* \*